United States Patent Office 3,558,164
Patented Jan. 26, 1971

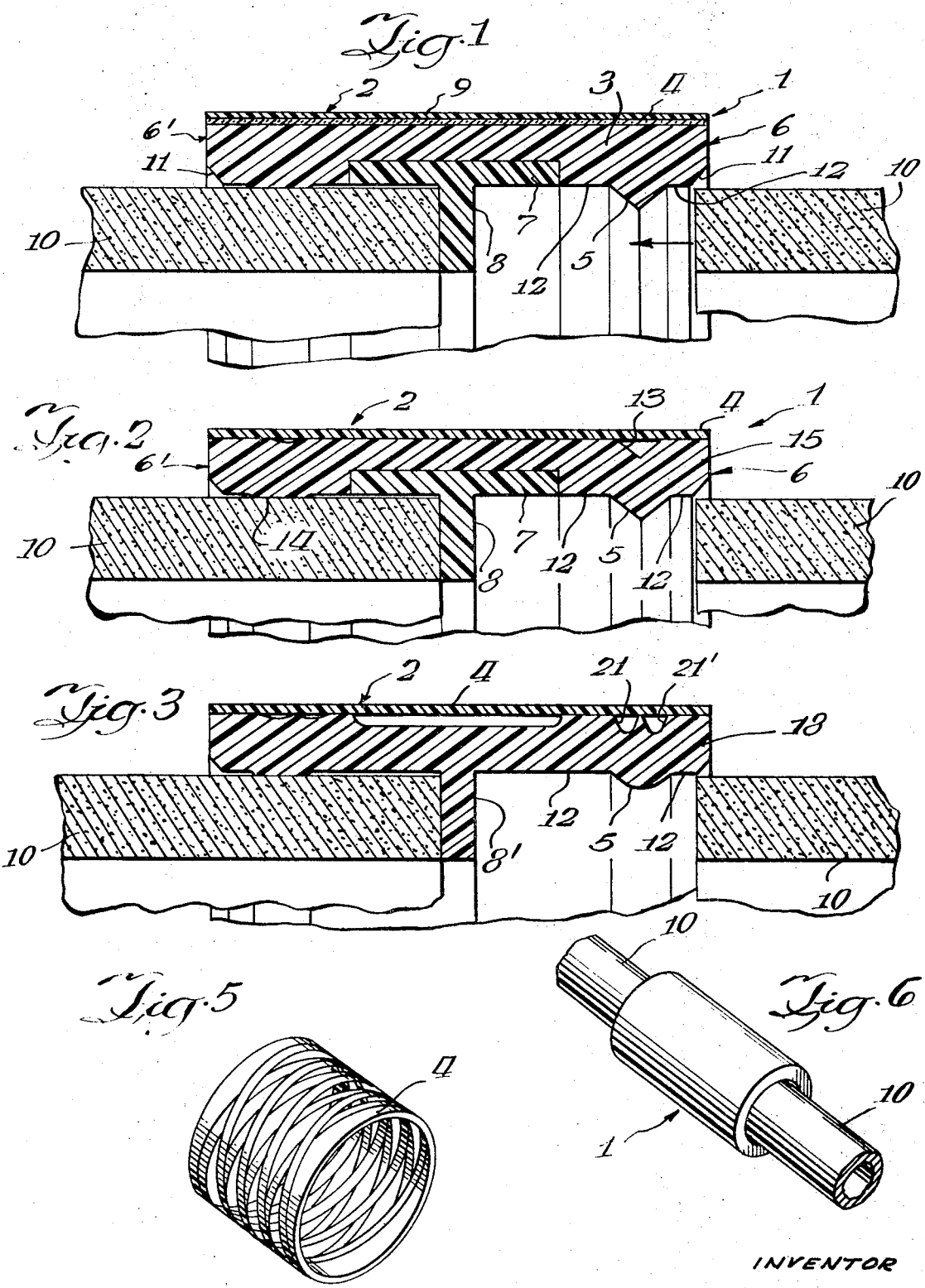

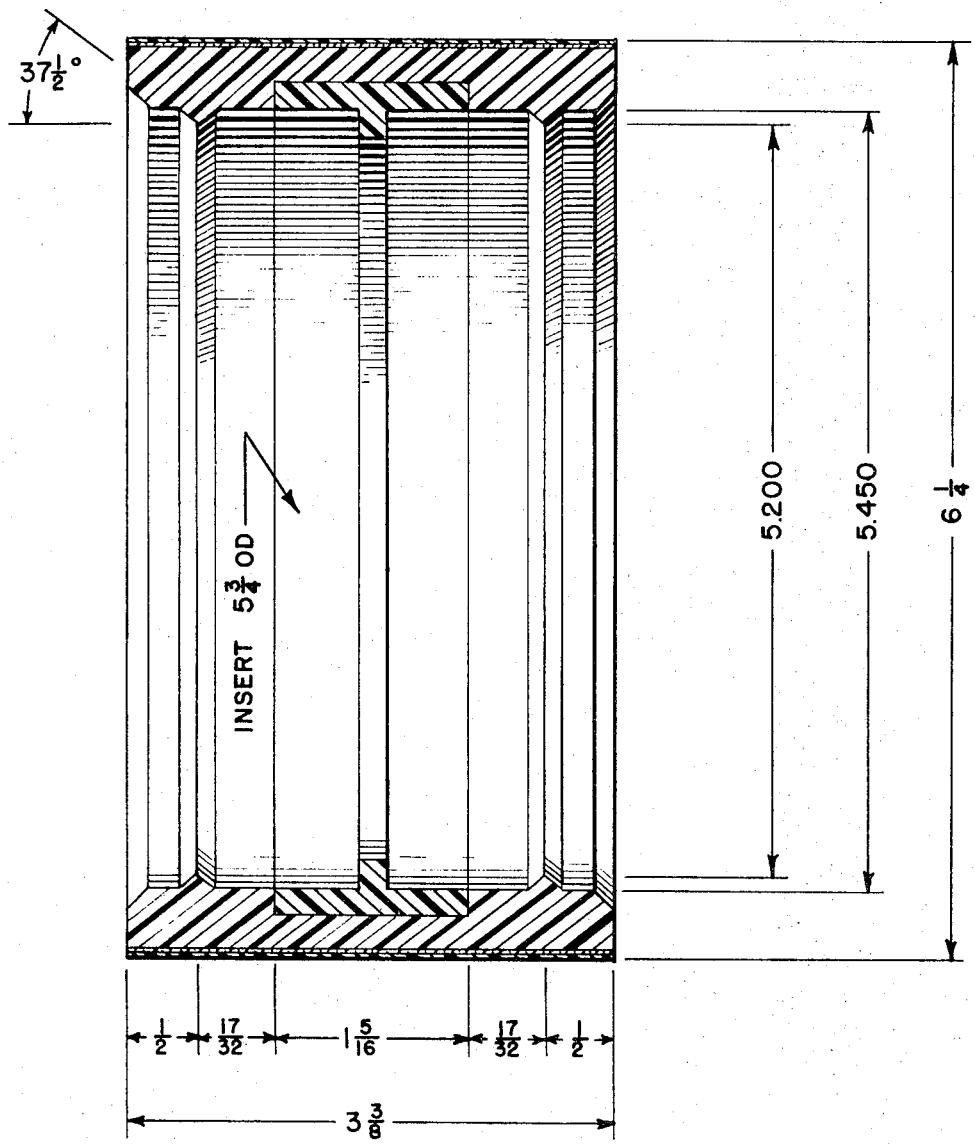

---

3,558,164
PIPE COUPLING
Richard F. Havell, Crystal Lake, Ill., assignor to National Clay Pipe Institute, Crystal Lake, Ill., a not-for-profit corporation of Illinois
Filed Dec. 11, 1968, Ser. No. 783,057
Int. Cl. F16l *21/00, 49/00*
U.S. Cl. 285—236                    8 Claims

ABSTRACT OF THE DISCLOSURE

A coupling for plain-end pipe is disclosed which comprises a unitary sleeve of elastomeric material such as rubber or urethane reinforced by a flexible tubular sheath of plastic or fiber glass. Near each end of the coupling, the inner surface of the elastomeric sleeve is provided with bead portions to grip and seal the pipe. The inner portion of the sleeve has a centrally located annular ring extending inwardly therefrom which may be removable and which serves as a pipe end stop.

BACKGROUND OF THE INVENTION

Vitrified clay pipe has satisfactorily been coupled in the past by compression joints in pipe having bell and spigot ends. While it has been recognized that pipe with plain ends, i.e., no bells, would have a number of advantages, a satisfactory coupling for plain-end pipe has heretofore been lacking.

By way of general background, the American Society for Testing and Materials (see ASTM specification C-594) has set out minimum standards for joints of vitrified clay plain end pipe. The test requirements are such that the joint must be capable of achieving a residual compression of at least 30 p.s.i. between a coupling and the pipe barrel, and that the coupling shall exhibit sufficient flexibility when tested with an internal 10 foot head of water (4.3 p.s.i.) for a period of one hour, to allow the following deflections without visible leakage:

| Nominal diameter, inches: | Deflection per foot of pipe length, inches |
|---|---|
| 4 to 12, inclusive | ½ |
| 15 to 24, inclusive | ⅜ |
| 27 to 36, inclusive | ¼ |

The ASTM specification, additionally, recommends that the pipe coupling shall be such that the joining be made with relative ease and that, when couplings are properly tightened they shall prevent the pipe from backing out so that further restraining is unnecessary to keep them in their original position.

Complicating the problem of providing a joint meeting the requirements as set forth above, is the fact that vitrified clay pipe may vary in diameter and may be "out-of-round" as a result of the high temperatures used in firing the pipe. At times, there is as much as ⅜ inch or more variation in circumference in 4 inch nominal diameter pipe.

Additionally, to take full advantage of the lack of bells, the coupling should be completely separate from the pipe so as to permit use of the coupling in connecting cut lengths. This also avoids loss of the coupling when a pipe is broken and has to be replaced in the field. Furthermore, it is important that the coupling be such that no tools are needed for assembly of the coupling to the pipe.

SUMMARY OF THE INVENTION

This invention relates to pipe couplings and more particularly to a coupling which is suitable for joining plain-end vitrified clay pipe.

In accordance with the present invention, a pipe coupling is provided which comprises an inner unitary sleeve structure having opposite sleeve portions for receiving the ends of the pipes in confronting relation. Each sleeve end portion includes a layer of relatively soft elastomeric material having an inner peripheral bead and is backed by a thin walled flexible restraining sheath means for sustaining compression of the corresponding bead in gripping and sealing engagement about the corresponding pipe end. Thus, there is provided a simple and inexpensive type coupling that can be used with plain-end pipe and which will provide joints which not only satisfy ASTM requirements but, in doing so, will accommodate variations in pipe diameter and pipe which is "out-of-round."

In accordance with one embodiment of the present invention, a pipe coupling is provided which comprises an outer reinforcing tubular sheath of flexible material having uniform inner and outer diameters. There is thus provided a coupling which can be easily molded utilizing simple molds so that the coupling can be cast by manufacturers without the skills required for molding and extruding plastics.

In accordance with the preferred embodiment of the present invention, a removable insert, having a generally T-shaped cross-section is fitted into a recess portion provided in the inside surface of the sleeve at the central region thereof to serve as a pipe-stop. When one pipe in a completed line must be replaced, the pipe stop is removed and the coupling slid completely over the remaining pipe. Thus, there is provided a coupling that permits replacement of a pipe in a completed line without the loss of the coupling.

Other features and advantages of the invention will be apparent from the following description and claims are illustrated in the accompanying drawings which show structure embodying preferred features of the present invention and the principals thereof, and what is now considered to be the best mode in which to apply these principles.

BRIEF DESCRIPTION OF THE DRAWINGS

In the accompanying drawings forming a part of the specification in which like numerals are employed to designate like parts throughout the same, FIG. 1 is an axial half-section of a pipe coupling in accordance with the invention showing two pipe sections and a connecting coupling, one pipe section being shown in place and the other in the process of being introduced into the coupling;

FIGS. 2 and 3 are similar to FIG. 1 and show other embodiments of a coupling made in accordance with the present invention;

FIG. 4 is an axial section of a specific coupling made in accordance with the present invention and showing for purposes of complete disclosure its dimensions;

FIG. 5 is a perspective view of a reinforcing collar used in accordance with the present invention; and FIG. 6 is a fragmentary perspective view of a pipe line joint.

DESCRIPTION OF PREFERRED EMBODIMENT

Referring now to FIGS. 1 and 6, there is shown a pipe joint in accordance with the invention comprising two plain-end vitrified clay pipe sections 10 and a coupling 1. The coupling comprises a sleeve structure, including a sleeve 3 and a restraining sheath 4. Inner edge bevel portions 11 of the two opposite ends of the sleeve 3 facilitate insertion and removal of pipe 10. Beads 5, located axially inwardly from the bevel portions 11 are shown as integral portions of the sleeve 3. The restraining sheath 4 provides firm backing for the sleeve 3 for sustaining compression of the corresponding bead 5 in gripping and sealing engagement about the pipe end.

At approximately its center, the interior of the sleeve 3 is provided with a pipe-stop 8 in the form of a continuous inwardly projecting ring having an inside diameter approximately equal to the inside diameter of the pipe. In the embodiment shown in FIG. 1, the pipe stop 8 is carried as an integral extension of a removable section 7 of generally T-shaped cross section to serve as an end stop locator and seal ring unit that is disposed in an annular circumambient recess in the sleeve 3 to engage in axially abutting relation to adjacent portions of the sleeve.

As mentioned previously, vitrified clay pipe, because of the manner in which it is made may vary slightly in diameter and can be "out-of-round." To provide a secure joint and fluid tight seal, the sleeve 3 is of elastomeric material. While other elastomeric materials can be used, sleeve 3 preferably is comprised of urethane since elastomeric castings can easily be made with such material.

To accommodate pipe which may vary in diameter and is "out-of-round," the inner diameter of the sleeve 3 at the opposite sleeve end portions 12 is made slightly larger than the maximum outer diameter of the range of outer diameters expected for any given nominal diameter pipe. Similarly, the minimum inner diameter of the sleeve 3 at the bead regions 5 is made slightly smaller than the minimum outer diameter of the range of outer diameters expected. When "out-of-round" pipe ends are inserted into the coupling 1, the sleeve 3, including the beads 5, assumes the shape of the pipes to insure that the entire circumference of the beads 5 contacts the surface portions of the pipe.

To insure a secure gripping and fluid tight engagement of the pipe ends by beads 5, the sleeve 3 is reinforced by a generally tubular thin walled restraining sheath 4. When pipe is inserted, beads 5 are compressed between the surface of the pipes and the restraining sheath 4. In the preferred embodiment of FIG. 1, a glass filament wound tubular structure is used as the restaining sheath 4. A number of benefits are achieved by using a glass fiber sheath as the restraining member, including the following:

(1) Its high tensile strength provides excellent reinforcement against stresses that occur in shear loading.

(2) Combined with high-strength it has excellent flexibility which enables the elastomeric sleeve to accommodate itself to "out-of-round" pipe.

(3) Glass fiber is chemically inert, thereby insuring longer life for the coupling.

(4) Such sheaths are readily available at low cost.

(5) Its resistance to "creep" resulting from the hoop-stress which is generated due to the compression of the beads, is high.

The design of the beaded portion 5 of sleeve 3 is such that it permits relative movement between the bead portion 5 and the pipe 10 in either direction. This is important as it provides the capability for the coupling of sliding completely over a pipe as is necessary when replacing a broken pipe in a complete line. Accordingly, while the beads 5 are shown in the figures to be provided with a generally V-shaped cross-section, it is desirable only that they be of a symmetrical shape.

As shown in the embodiment of FIG. 1, the restraining sheath 4 has been cast in the place when the sleeve 3 is poured. This method simplifies the construction of the coupling 1. The cast-in-place restraining sheath 4 of embodiment 1 is shown in FIG. 4 as being of fiber glass and having an open basket winding which provides easier casting of the sleeve 3 because of the resin flow through the openings.

A number of advantages are provided by the removable type stop section 7 as shown in FIG. 1. Its removal from the sleeve 3 enables the coupling to be slid entirely over the pipe. As previously mentioned, this is advantageous as it enables a section of damaged pipe to be replaced in the field without the loss of a coupling. Further, tests indicate that greater flexibility, without leakage, in the coupling is achieved when using the insert. Finally, the insert may be made of a less expensive material, e.g. polyethylene, thereby reducing the cost of the coupling.

By way of example, for purposes of illustrative disclosure, a coupling for a 4 inch pipe having a circumference range of 16½ to 16⅞ inches (5¼ to 5⅜″ diameter) may be constructed with the dimensions as shown in FIG. 5. Using sheaths of fiber glass, such couplings have withstood a 600 pound shear load and did not leak at water pressures up to 17 p.s.i.g. At 600 pounds shear load, the deflection was ¾″.

DESCRIPTION OF THE EMBODIMENT OF FIG. 2

Referring to FIG. 2 there is shown another embodiment of a pipe coupling made in accordance with the present invention. The essential difference between the embodiments of FIGS. 1 and 2 is that the sleeve 15 of FIG. 2 is comprised of a harder elastomeric material than that of sleeve 3. A pair of grooves 13 are cast on the outer surface of the sleeve 15 to provide a space into which the elastomeric material of sleeve 15 can be displaced as the beads 5 are compressed. In this embodiment, the restraining sheath 4 is shown cemented to the outer surface of the sleeve 15.

DESCRIPTION OF THE EMBODIMENT OF FIG. 3

Another embodiment of the present invention is shown in FIG. 3. As in the embodiment of FIG. 2, the elastomeric material comprising sleeve 18 is slightly harder than that comprising sleeve 3 of FIG. 1. Additionally the bead portion 5 is shown having a generally circular cross section. In this embodiment, the pipe-stop 8 is shown as an integral portion of the sleeve 18.

In connecting two pipes, the pipe ends are easily stabbed into the opposite ends of the coupling. No tools are needed for this purpose. A fluid-tight seal is formed even though only a pair of sealer beads are used because the inherent flexibility of the coupling permits each end of the coupling to assume the exact shape of the pipe being introduced. If one pipe in a completed line of piping needs to be replaced, it is merely withdrawn from the two couplings joining it to the line. The removable pipe-stop section 7 in the case of the embodiment shown in FIGS. 1 and 2, are then removed from the couplings and the entire couplings slid onto the remaining pipes of the line. A new pipe can then be placed into the pipeline, and the couplings slid into engagement with the ends of the pipe.

Thus while preferred constructional features of the invention are embodied in the structure illustrated herein, it is to be understood that changes and variations may be made by those skilled in the art without departing from the spirit and scope of the appended claims.

The embodiments of the invention in which an exclusive privilege or property is claimed are defined as follows:

1. A coupling for joining plain end pipes comprising a tubular-shaped sleeve structure of relatively soft elastomeric material having aligned opposite sleeve end portions for receiving the ends of the pipes in confronting relation, each of said sleeve end portions having an integral circumambient inner peripheral bead located intermediately therealong and projecting radially inwardly for endless gripping and sealing engagement with the corresponding pipe end, and a one-piece circumferentially continuous, substantially cylindrical thin-walled restraining sheath concentric with and fixed relative to said sleeve structure to extend between and beyond said beads and to encircle a major region of the thickness of the sleeve structure, said sheath being of resiliently flexible, stretch-resistant, non-metallic material of greater hardness than the elastomeric material of said sleeve structure, whereby the sleeve structure is able to conform to a variety of out-of-round pipe ends with each bead in sustained sealing compression therewith.

2. A coupling in accordance with claim 1 wherein the sheath material is fiber glass.

3. A coupling in accordance with claim 2 wherein the sheath is of open-basket weave construction and substantially encasing the sleeve structure in cast-in-place interconnected relation therewith.

4. A coupling in accordance with claim 2 wherein each bead has a minimum diameter region intermediate of its axial extremities.

5. A coupling in accordance with claim 2 wherein said sleeve structure includes an internal circumambient recess disposed intermediately between said sleeve end portions, and further including an end stop locator of elastomeric material disposed in said recess in axially-abutting relation to adjacent portions of said sleeve structure.

6. A coupling for joining plain end pipes comprising a tubular-shaped sleeve structure of relatively soft elastomeric material having aligned opposite sleeve end portions for receiving the ends of the pipes in confronting relation, each of said sleeve end portions having an integral circumambient inner peripheral bead located intermediately therealong projecting radially inwardly for endless gripping and sealing engagement with the corresponding pipe end, and a generally cylindrical, circumferentially continuous thin-walled tubular restraining sheath of glass fiber material encasing said sleeve structure and extending between and beyond said beads, said sheath being fixed to said sleeve structure to flex therewith in accommodating out-of-round pipe and to sustain sealing compression of the beads against the pipe ends.

7. A coupling in accordance with claim 6 wherein the sheath is of open-basket weave construction, said sheath being in cast-in-place interconnected relation with said sleeve structure.

8. A coupling in accordance with claim 6 wherein each bead has a minimum diameter region intermediate its axial extremities.

References Cited

UNITED STATES PATENTS

| | | | |
|---|---|---|---|
| 2,871,031 | 1/1959 | Altemus et al. | 285—230X |
| 3,179,445 | 4/1965 | Moretti | 285—231X |
| 3,394,952 | 7/1968 | Garrett | 285—236 |
| 3,424,482 | 1/1969 | Ligon | 285—230 |
| 3,432,187 | 3/1969 | Mooney et al. | 285—423X |
| 3,453,006 | 7/1969 | Levake | 285—235X |
| 2,711,331 | 6/1955 | Temple | 285—236X |
| 3,233,922 | 2/1966 | Evans | 285—236 |

FOREIGN PATENTS

| | | | |
|---|---|---|---|
| 704,944 | 3/1931 | France | 285—235 |

THOMAS F. CALLAGHAN, Primary Examiner

U.S. Cl. X.R.

285—423